(12) United States Patent
Kumar et al.

(10) Patent No.: US 12,494,968 B2
(45) Date of Patent: Dec. 9, 2025

(54) SYSTEM AND METHOD FOR CHANGE REQUEST ASSISTED POLICY STATE MANAGEMENT

(71) Applicant: RAKUTEN SYMPHONY, INC., Tokyo (JP)

(72) Inventors: Vijay Kumar, Indore (IN); Hari Sridasyam, Indore (IN); Sayan Sarkar, Indore (IN); Sandeep Karkala, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/044,573

(22) PCT Filed: Nov. 18, 2022

(86) PCT No.: PCT/US2022/050370
§ 371 (c)(1),
(2) Date: Mar. 9, 2023

(87) PCT Pub. No.: WO2024/107199
PCT Pub. Date: May 23, 2024

(65) Prior Publication Data
US 2025/0080422 A1    Mar. 6, 2025

(51) Int. Cl.
*H04L 41/0894* (2022.01)
*H04L 41/0813* (2022.01)

(52) U.S. Cl.
CPC ...... *H04L 41/0894* (2022.05); *H04L 41/0813* (2013.01)

(58) Field of Classification Search
None
See application file for complete search history.

(56) References Cited

U.S. PATENT DOCUMENTS

| | | | |
|---|---|---|---|
| 7,627,891 B2 * | 12/2009 | Williams | H04L 63/1408 709/224 |
| 2018/0309632 A1* | 10/2018 | Kompella | H04L 41/0895 |
| 2019/0108331 A1* | 4/2019 | Judson | G06Q 20/40 |
| 2020/0257554 A1* | 8/2020 | Okuno | G06F 9/5077 |

* cited by examiner

*Primary Examiner* — Atta Khan
(74) *Attorney, Agent, or Firm* — HAUPTMAN HAM, LLP

(57) ABSTRACT

A method executed by processing circuitry, includes receiving, from a user interface (UI), one or more network assurance policies configured to be used in a CPE; receiving, periodically from a change request (CR) adaptor service, one or more active change requests (CRs) configured to be implemented; storing the one or more active CRs to an active scheduled CR table included in a network assurance policy database (DB); filtering, by an ingestion service of the CPE that screens incoming event streams based on the one or more network assurance policies, further the incoming event streams based on the active CRs within the active scheduled CR table; and discarding each incoming event from the incoming event streams that matches a dependent network element (NE) or a dependent network service (NS) that is within a CR time window where the CR time window is a period where a CR is being implemented.

20 Claims, 11 Drawing Sheets

SYSTEM AND METHOD FOR CHANGE REQUEST ASSISTED POLICY STATE MANAGEMENT

RELATED APPLICATIONS

The present application is a National Phase of International Application No. PCT/US2022/050370, filed Nov. 18, 2022.

TECHNICAL FIELD

This description relates to a system for change request (CR) assisted policy state management and method of using the same.

BACKGROUND

Event-driven architecture (EDA) is a software architecture promoting the production, detection, consumption of, and reaction to events. An event is a change in state, or an annotated label based on an entity's log output in a system. For example, when a consumer purchases an online product, the product's state changes from "for sale" to "sold". A seller's system architecture treats this state change as an event whose occurrence is made known to other applications within the architecture.

What is produced, published, propagated, detected, or consumed is a message called the event notification, and not the event, which is the state change that triggered the message emission. Events occur and event messages are generated and propagated to report the event that occurred. Nevertheless, the term event is often used metonymically to denote the notification event message. The EDA is often designed atop message-driven architectures, where such a communication pattern includes one of the inputs to be text-based (e.g., the message) to differentiate how each communication is handled.

SUMMARY

In some embodiments, a system includes processing circuitry; and a memory connected to the processing circuitry, wherein the memory is configured to store executable instructions that, in response to being executed by the processing circuitry, facilitate performance of operations to receive, from a user interface (UI), one or more network assurance policies configured to be used in a correlation and policy engine (CPE); store, by the processing circuitry, the one or more network assurance policies in a database (DB); receive, periodically from a change request (CR) adaptor service, one or more active CRs configured to be implemented; store, by the processing circuitry, the one or more active CRs to an active scheduled CR table; and modify, by the processing circuitry, one or more network assurance policy states based on a CR time window that includes a CR start date and a CR end date for each network assurance policy.

In some embodiments, a method executed by processing circuitry, includes receiving, from a user interface (UI), one or more network assurance policies configured to be used in a correlation and policy engine (CPE); receiving, periodically from a change request (CR) adaptor service, one or more active change requests (CRs) configured to be implemented; storing the one or more active CRs to an active scheduled CR table included in a network assurance policy database (DB); filtering, by an ingestion service of the CPE that screens incoming event streams based on the one or more network assurance policies, further the incoming event streams based on the active CRs within the active scheduled CR table; and discarding each incoming event from the incoming event streams that matches a dependent network element (NE) or a dependent network service (NS) that is within a CR time window where the CR time window is a period of time where a CR is being implemented.

In some embodiments, a non-transitory, tangible computer readable storage medium storing a computer program, wherein the computer program contains instructions that in response to being executed, cause processing circuitry to perform operations to, receive, from a user interface (UI), one or more network assurance policies configured to be used in a correlation and policy engine (CPE); store the one or more network assurance policies in a network assurance policy DB; filter, by an action service of the CPE that screens incoming event streams based on each active CR received, periodically from a change request (CR) adaptor service; and discard each incoming event from the incoming event streams that matches a dependent network element (NE) or a dependent network service (NS) that is within a CR time window where the CR time window is a period where a CR is being implemented.

BRIEF DESCRIPTION OF THE DRAWINGS

Aspects of the present disclosure are best understood from the following detailed description read with the accompanying FIGS. In accordance with the standard practice in the industry, various features are not drawn to scale. The dimensions of the various features are arbitrarily increased or reduced for clarity of discussion.

DETAILED DESCRIPTION

Figure 1:
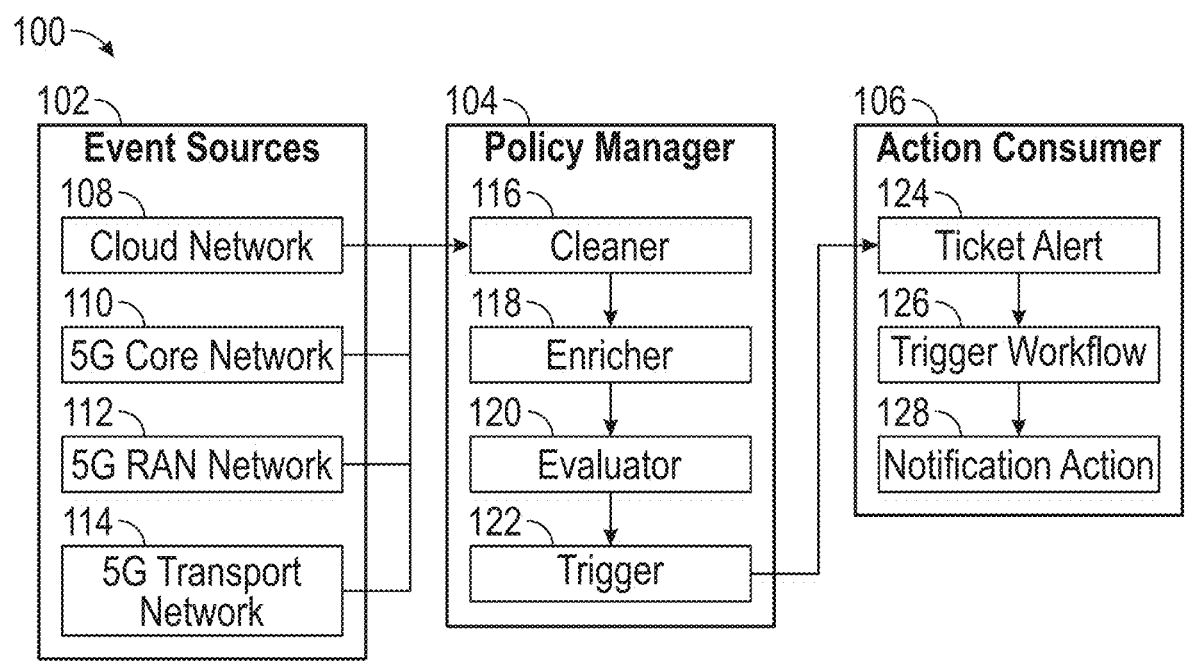
FIG. 1 is a block diagram of a correlation and policy engine (CPE), in accordance with some embodiments.

The following embodiments include many different examples, for implementing different features of the subject matter. Examples of components, values, operations, materials, arrangements, or the like, are described below to simplify the embodiments. These are, of course, examples and unintended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the present disclosure repeats reference numerals and/or letters in the various examples. This repetition is for the purpose of simplicity and clarity and any indication of a relationship between the various embodiments and/or configurations discussed is unintended.

Further, spatially relative terms, such as "beneath," "below," "lower," "above," "upper" and the like, are usable herein for ease of description to describe one element or feature's relationship to another element or feature as illustrated in the FIGS. The spatially relative terms are intended to encompass different orientations of the device in use or operation in addition to the orientation depicted in the FIGS. One or more apparatus embodiments are otherwise oriented (rotated 90 degrees or at other orientations) and the spatially relative descriptors usable herein likewise are interpreted accordingly.

An EDA architectural pattern is applied by the design and implementation of applications and systems that transmit event messages among loosely coupled software components and services. An event-driven system typically consists of event emitters (agents, data sources), event consumers (sinks), and event channels (the medium the event messages travel from emitter to consumer). Event emitters detect, gather, and transfer event messages. An event emitter is unable to know the consumers of the event messages, the event emitter is unable to even know whether an event consumer exists, and in the event the consumer exists, the event emitter is unable to know how the event message is used or further processed. Event consumers apply a reaction as soon as an event message is presented. The reaction is or is not completely provided by the event consumer. For example, the event consumer filters the event message frame while the event policy executes and produces transformation and forwards the event message frame to another component or the event consumer supplies a self-contained reaction to such event message frame. Event channels are conduits in which event message frames are transmitted from event emitters to event consumers. In some embodiments, event consumers become event emitters after receiving event message frames and then forwarding the event message frames to other event consumers. The configuration of the correct distribution of event message frames is present within the event channel. The physical implementation of event channels is based on components, such as message-oriented middleware or point-to-point communication, which might rely on a more appropriate transactional executive framework (such as a configuration file that establishes the event channel).

A correlation and policy engine (CPE) is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In programming and software design, an event is a change of state (e.g., an action or occurrence) recognized by software, often originating asynchronously from the external environment that is handled by the software. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g., to communicate the completion of a task). Software that changes behavior in response to event messages is said to be event-driven, often with the goal of being interactive.

A policy manager is network assurance policy engine which triggers actions towards northbound systems based upon matching the condition defined for events received from southbound systems.

A policy manager determines the degree to which a service/device is allowed to do what the service/device is attempting/requesting (decision) and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

A rule-based system is used to store and manipulate knowledge to interpret information in a useful way. Normally, the term rule-based system is applied to systems involving human-crafted or curated rule sets.

In software defined networking (SDN), southbound interfaces are the OpenFlow protocol specification that enables communication between controllers, switches, and other network nodes, which are with lower-level components. This further lets the router identify network topology, determine network flows, and implement requests sent to the router via northbound interfaces. Southbound application programming interfaces (APIs) allow the end-user to gain better control over the network and promotes the efficiency level of a SDN controller to evolve based on real-time demands. In addition, the SDN controller communicates with the forwarding plane to modify the networks that let the SDN controller to progressively move along with the advancing enterprise calls. To compose a more responsive network layer to real-time traffic demands, administrators add or remove entries to the internal flow-table of network switches and routers.

Contradictory to southbound APIs, northbound interfaces allow communication among the higher-level components. While traditional networks use a firewall or load balancer to control data plane behavior, SDN installs applications that use the controller and these applications communicate with the controller through the northbound interface. The northbound API makes innovation or customization easier for network operators of the network controls and processing as this task doesn't require expertise, as the API is cleaned by a programmer who excels in programming languages. A northbound interface is an (API) or protocol that allows a lower-level network component to communicate with a higher-level or more central component, while a southbound interface allows a higher-level component to send commands to lower-level network components.

In some embodiments, change request (CR) assisted policy state management is discussed. A CR, also known as a change control request, or CCR, is a document containing a call for an adjustment of a system; configured for use in the change management process (a process in systems engineering of requesting, determining attainability, planning, implementing, and evaluating changes to a system). A CR is declarative, i.e., a CR states what is to be accomplished, but leaves out how the change is carried out. Important elements of a CR are an ID, a customer (ID), a deadline (if applicable), an indication whether the change is required or optional, a change type (often chosen from a domain-specific ontology) and a change abstract, which is a piece of narrative.

As discussed above, a network assurance policy engine is an assurance domain system (a system that ensures services offered over networks meet a pre-defined service quality level for an optimal subscriber experience) which triggers policy rules based upon a pre-determined SLA or conditions defined in a policy. The policy rule includes network elements ((NE) features, functions, and capabilities that are provided by facility or equipment) and network services ((NS) an application running at the network application layer and above, that provides data storage, manipulation, presentation, communication, or other capability) against which action is taken when the SLA is matched. That is, in response to a network element or network service being out of accord with an SLA, then an action is taken to rectify the situation.

There are certain situations when these automated actions, driven by policies, are deferred. While deferment of automated actions is a rare event, deferment of automated actions is periodically helpful. In a non-limiting example, in response to a planned upgrade, a planned maintenance activity is scheduled instead of implementing one or more network assurance policy actions. A change management system keeps records of such activities.

In some embodiments, the policy manager controls the information from a change management (CM) module/change request (CR) system and defers the network assurance policy actions for a NE or NS subjected for a planned change.

In some embodiments, a method for CR assisted policy state management is discussed. In some embodiments, a focus is on internal system level network assurance policy state management based upon periodically received information from a CR system (e.g., once every 24 hours, once every 12 hours, once every hour, in real time, or the like). In some embodiments, a CR assisted policy trigger improves the network assurance area in a network automation portfolio.

In some embodiments, network assurance policies are created and stored in policy database (DB). In some embodiments, a CR adaptor service periodically fetches active CR details and stores the CR details to a scheduled CR table. In some embodiments, based upon the active scheduled CR table, the network assurance policy states are changed automatically. In some embodiments, the active CR table is maintained with a policy identification (ID), a dependent NE (e.g., the network element upon which a CR is to take effect on), a dependent NS (e.g., the network service upon which a CR is to take effect on), a CR start date, and a CR end date. In some embodiments, the rule-based active policies, as per policy ID, in response to a CR being true (meaning there is a CR to be implemented) for a subjected dependent NE or a dependent NS, change state from an active state (e.g., automatically taking action when the SLA is matched with an event to take an action) to a ready state (e.g., the process is scheduled to run after CR execution or the event is discarded). In response to a CR time window (e.g., the CR start date to the CR end date) expiring, the network assurance policy state is again changed at the backend (data access layer) from a ready state to an active state.

In some embodiments, a method for policy onboarding unification is discussed. In some embodiments, a CR assisted policy trigger management is discussed. In some embodiments, a method of CR assisted policy trigger management that improves the network assurance area in a network automation portfolio.

In some embodiments, the network assurance policies are created and stored in policy DB. In some embodiments, the CR adaptor service periodically fetches the active CR details. In some embodiments, a policy DB stores the CR details to an active scheduled CR table. In some embodiments, an ingestion service, (a platform accepting and filtering event messages) while screening incoming event streams against active rule-based policies, further screens the active scheduled CR table. In some embodiments, the active scheduled CR table is maintained with a policy ID, a dependent NE, a dependent NS, a CR start date, and a CR end date. In some embodiments, events matching a dependent NE or a dependent NS with an active CR are discarded before being forwarded to the next level of event processing during the CR time window. In some embodiments, the CR screening is enabled at ingestion layer.

In some embodiments, a method for policy onboarding unification is discussed. In some embodiments, a real time CR assisted policy action management method is discussed. In some embodiments, the focus is on real-time based CR system integration before execution of policy driven actions. In some embodiments, the CR assisted policy trigger improves the network assurance area in network automation portfolio.

In some embodiments, the network assurance policies are created and stored in a policy DB. In some embodiments, a CR adaptor service interacts with a CR system in real time. In some embodiments, before triggering an action, the action service screens incoming event streams from an evaluated service (evaluates and processes enriched events arriving) with one or more active CR in real time sent from a CR adaptor. In some embodiments, the real time event screening is enabled with a policy ID, a dependent NE, a dependent NS, a CR start date, and a CR end date. In some embodiments, the events matching a dependent NE or a dependent NS with an active CR are discarded to avoid an action during the CR time window. In some embodiments, the CR scanning is enabled before triggering a final action directed towards a northbound system.

FIG. 1 is a block diagram of a correlation and policy engine (CPE) 100, in accordance with some embodiments.

CPE 100 generally includes an event sources input block 102, policy manager block 104, and an action consumer block 106.

Event sources input block 102 includes event emitters (agents, data sources, and other suitable event emitters within embodiments of the present invention). Event emitters detect, gather, and transfer event messages. An event emitter is unable to know the consumers of the event messages, the event emitter is unable to even know whether an event consumer exists, and in the event the consumer exists, the event emitter is unable to know how the event message is used or further processed.

Event sources 102 include events from a cloud network 108. Cloud network computing is on-demand availability of computer system resources, especially data storage (e.g., cloud storage) and computing power, without direct active management by the user. Large clouds often have functions distributed over multiple locations, each location being a data center. Event sources from cloud network 108 are events occurring in the cloud network. In a non-limiting example, one or more incidents occurring within a data center (a building, a dedicated space within a building, or a group of buildings used to house computer systems and associated components, such as telecommunications and storage systems) of cloud network 108.

Event sources 102 include events from a 5G core network (CN) 110. A backbone or CN 110 is a part of a computer network which interconnects networks, providing a path for the exchange of information between different local area networks (LANs) or subnetworks. A CN ties together diverse networks in the same building, in different buildings in a campus environment, or over wide areas. A large corporation that has many locations has a CN that ties the locations together, for example, in response to a server cluster needing to be accessed by different departments of a company that are located at different geographical locations. The pieces of the network connections (for example: ethernet, wireless) that bring these departments together is often referred to as the CN. One example of a CN is the Internet backbone. Event sources from 5G CN 110 are events occurring in the 5G CN. In a non-limiting example, one or more incidents occurring within a server cluster (a set of servers that work together and viewed as a single system where each node is set to perform the same task, controlled, and scheduled by software) of 5G CN 110.

Event sources 102 include events from a 5G radio access network (RAN) 112. A RAN is part of a mobile telecommunication system. A RAN implements a radio access technology. RANs reside between a device such as a mobile phone, a computer, or remotely controlled machines and provides connection with a CN, such as CN 110. Depending on the standard, mobile phones and other wireless connected devices are varyingly known as user equipment (UE), terminal equipment, mobile station (MS), or other suitable equipment within embodiments. Examples of radio access network types include global system for mobile communications (GSM) radio access network, GSM RAN (GRAN), GERAN (essentially the same as GRAN but specifying the inclusion of EDGE packet radio services), universal mobile telecommunications system (UMTS) RAN, UMTS terrestrial RAN (UTRAN), and E-UTRAN (e.g., long term evolution (LTE) high speed and low latency radio access network). Event sources from 5G RAN 112 are events occurring in the 5G RAN. In a non-limiting example, one or more incidents occurring within terminal equipment and or mobile stations of 5G RAN 112.

Event sources 102 include events from 5G transport networks 114. 5G transport networks 114 include fronthaul and backhaul portions.

The backhaul portion of a network includes the intermediate links between the CN, such as CN 110, and small subnetworks at the edge of a network. The most common network type in which backhaul is implemented is a mobile network. A backhaul of a mobile network, also referred to as mobile-backhaul that connects a cell site to the CN. Two methods of mobile backhaul implementations are fiber-based backhaul and wireless point-to-point backhaul. In both the technical and commercial definitions, backhaul generally refers to the side of the network that communicates with the global Internet. Sometimes middle mile networks exist between the customer's own LAN and those exchanges. In some embodiments, this is a local wide area network (WAN) connection.

A fronthaul network is coincident with the backhaul network, but subtly different. In a cloud RAN (C-RAN) the backhaul data is decoded from the fronthaul network at centralized controllers, from where the backhaul data is then transferred to the CN. The fronthaul portion of a C-RAN includes the intermediate links between the centralized radio controllers and the radio heads (or masts) at the edge of a cellular network. Event sources from 5G transport networks 114 are events occurring in the 5G transport networks 114. In a non-limiting example, one or more incidents occurring within radio controllers or network switches of 5G transport networks 114.

Policy Manager 104 is a real-time complex event processing (CEP consists of a set of concepts and techniques for processing real-time events and extracting information from event streams as they arrive) engine at scale, which automates various workflows and network healing operations. CPE 100 processes events based on network assurance policies. Based upon pre-defined policies and rules policy manager 104 filters the events, enriches the events, correlates, and processes the events for action.

Policy manager 104 includes cleaner 116 that accepts the events from event sources block 102, removes unwanted events, and passes the filtered events to enricher 118 for further processing. In some embodiments, these filtered events are forwarded by using a message-policy cache built by a message-policy sync process. In computing, messages are passed between programs or between components of a single program. Message passing is a form of communication used in concurrent and parallel computing, object-oriented programming, and channel communication, where communication is made by sending messages to recipients. A message is sent to an object specifying a request for action.

Policy manager 104 includes enricher 118 which enriches the messages arriving from cleaner 116 with inventory information to successfully execute a policy. In some embodiments, enricher 118 is configured with a message-enrichment cache built by an enricher sync process. In a non-limiting example, received event data is missing fields or parameters. Events are then enriched with the help of an inventory to fill the missing fields and parameters, so decisions are made, and predetermined actions occur.

Policy manager 104 includes evaluator 120 that evaluates and processes the enriched events arriving from enricher 118. Evaluator 120 is configured to identify root causes (e.g., what is causing or initiating the received events), decide relevant actions pursuant to predetermined network assurance policies, and inform action manager 120 accordingly.

Policy manager 104 includes trigger 122 that matches a network assurance policy with an event based on the output of evaluator 120 identifying the root causes of the received events. Trigger 122 then forwards the matched policy/event to action consumer 106 to begin an action workflow.

Action consumer 106 includes ticket alert 124. Ticket alert 124 creates an incident creation or a trigger to begin a workflow action.

Action consumer 106 includes trigger workflow 126. In some embodiments, trigger workflow 126 performs actions based on a user-created network assurance policy. In some embodiments, trigger workflow 126 initiates the sending of a notification. In some embodiments, trigger workflow 126 initiates a reboot, restart, scale in, scale out, or other suitable actions within embodiments.

Action consumer 106 includes a notification action 128. In some embodiments, notification action 128 is an email, text message or graphical user interface (GUI) display on a user interface, such as user interface 1118 (FIG. 11) notifying the policy creator and/or network operator an event was received, diagnosed, an action taken, and the result of the action taken (e.g., the action taken was successful or failed).

Figure 2:
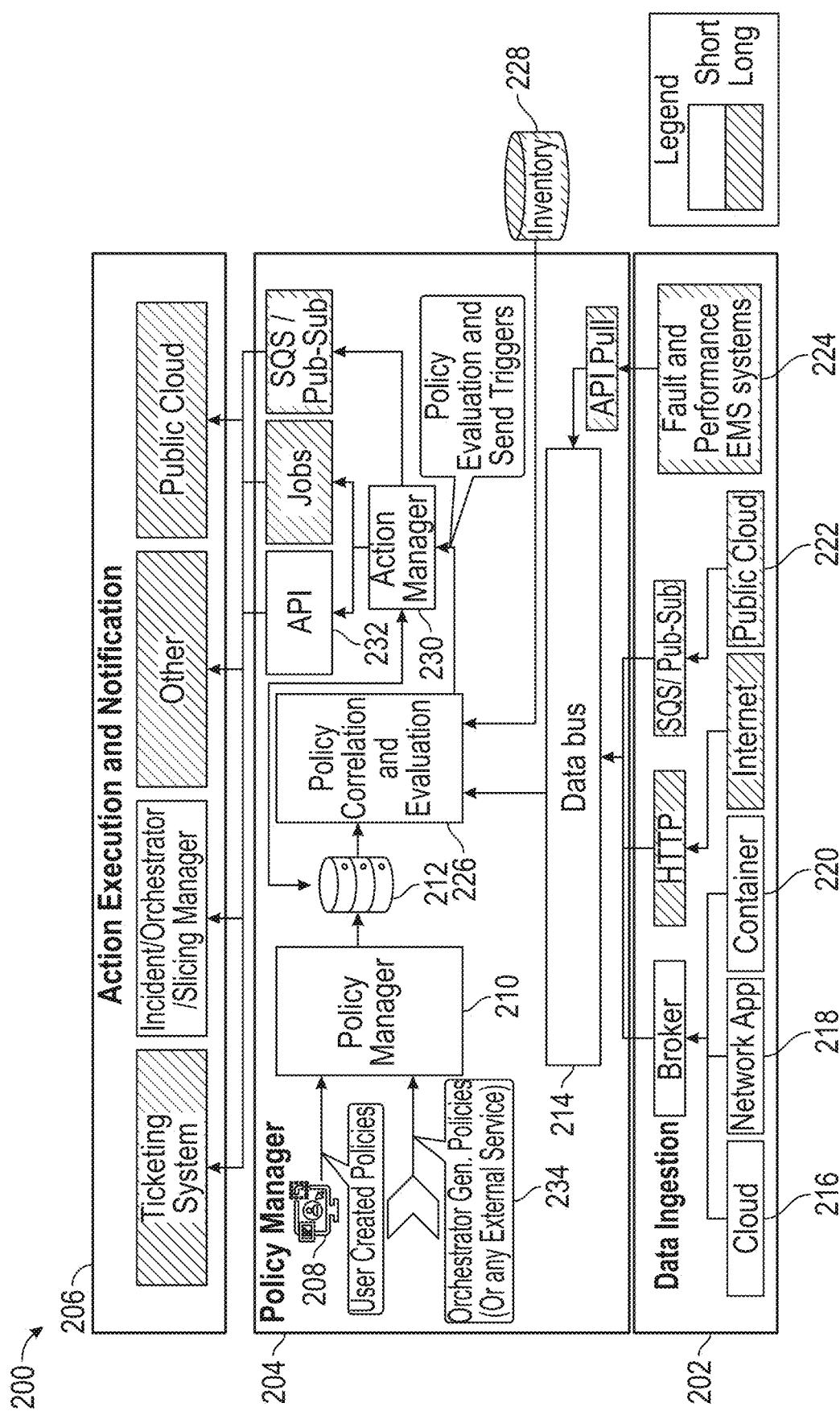
FIG. 2 is a diagrammatic representation a correlation and policy engine (CPE), in accordance with some embodiments.

FIG. 2 is a diagrammatic representation a correlation and policy engine (CPE) 200, in accordance with some embodiments.

In some embodiments, CPE 200 is like CPE 100. In some embodiments, event sources 202 is like data ingestion block 102, policy manager 204 is like policy manager 104, and action consumer 206 is like action manager 106.

Policy Manager 204 is a real-time CEP engine at scale, which automates various workflows and network healing operations (e.g., repair and/or restoration). Policy manager 204 processes events based on predetermined network assurance policies and/or rules. Policy manager 204 filters the events, enriches the events, correlates, and processes the events for action. Policy manager 204 provides a framework to support CEP capabilities. In some embodiments, in memory computation logic mitigates latency issues. In some embodiments, multi-source events ingestion covers broader use cases in complex networks and infrastructure. In some embodiments, policy manager 204 is configured with scalable architecture based upon a business requirement (e.g., a new business policy being implemented). In some embodiments, policy manager 204 supports multiple computation logic in near-real time processing, such as event followed by, event AND, event OR, count of event occurrences, and mathematical operations on event counters. In a non-limiting example, the computation logic supports performing an action managed by action manager 230 in response to XYZ event, followed by ABC event, AND (UVW event OR DEF event) along with ten event GHI occurrences. In some embodiments, policy queries are applied on a potentially infinite stream of data. In some embodiments, events are processed immediately. In some embodiments, once policy manager 204 processes events for a matching sequence, results are driven directly. In some embodiments, this aspect effectively leads to policy manager 204 having a near real-time capability.

Figure 11:
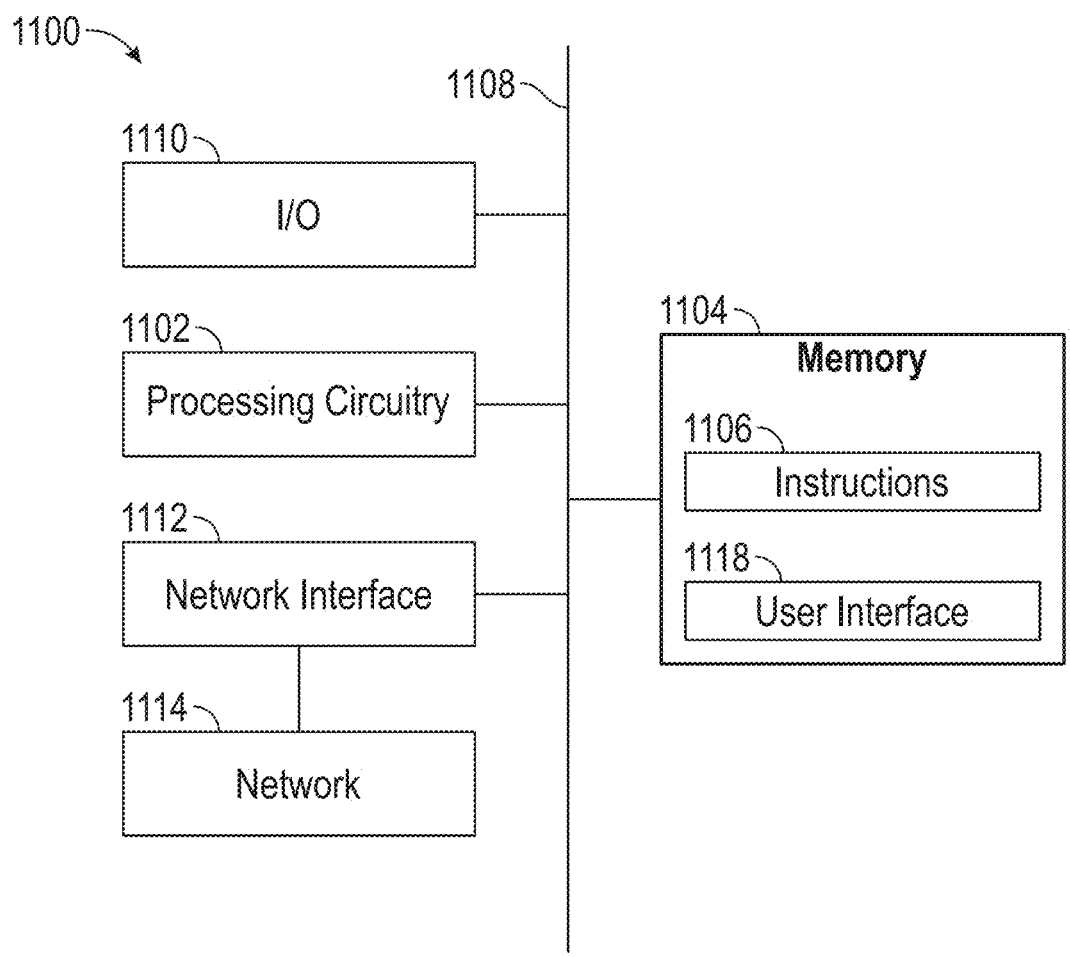
FIG. 11 is a high-level functional block diagram of a correlation and policy processor-based system, in accordance with some embodiments.

Users and/or network operators create policy templates using UI 208. In some embodiments, UI 208 is configured with GUIs that are configured to allow a user to view policy creation templates where the user enters information to create a policy. In some embodiments, UI 208 is like UI 1118 (FIG. 11). In some embodiments, an orchestrator 234 (orchestration is the automated configuration, coordination, and management of computer systems and software) provides general policies, artificial intelligence (AI) generated policies or policies from any external service. The generated policies are sent to policy manager 210 and policy manager 210 relays the created policies to database 212.

The created policy templates are saved in database 212 as a draft. The policy templates are configured to be validated, activated, de-activated, edited, and deleted. Thus, templates are stored in database 212 until needed and then activated upon command by a user.

Data bus 214 receives data from various sources from data ingestion block 202, such as cloud platform 216, network applications 218, container applications 220, other events through the Internet, events through a public cloud 222, and events through a fault and performance system 224.

In response to received event data at data bus 214 missing fields and/or parameters, these events with missing fields and/or parameters are enriched at policy correlation and evaluation (PCE) module 226 through inventory 228 that provides the missing fields and/or parameters, to make decisions and take predetermined actions. In some embodiments, this is referred to as inventory enrichment.

PCE module 226 logically evaluates and processes the events from data bus 214 based on policies from policy manager 210. PCE 226 is configured to identify root causes of events, determine relevant actions pursuant to the predetermined policies, and inform action manager 230 accordingly of any relevant actions pursuant to the predetermined policies.

Action manager 230 accepts the results after event processing by PCE 226 and takes the corresponding action related to that result. In a non-limiting example, action manager 230 sends an email, sends a request to an API endpoint 232, or other suitable action within embodiments. Action Manager 230 obtains the status of the executed action and updates the database 212 so that users visualize a job status in UI 208.

Figure 3:
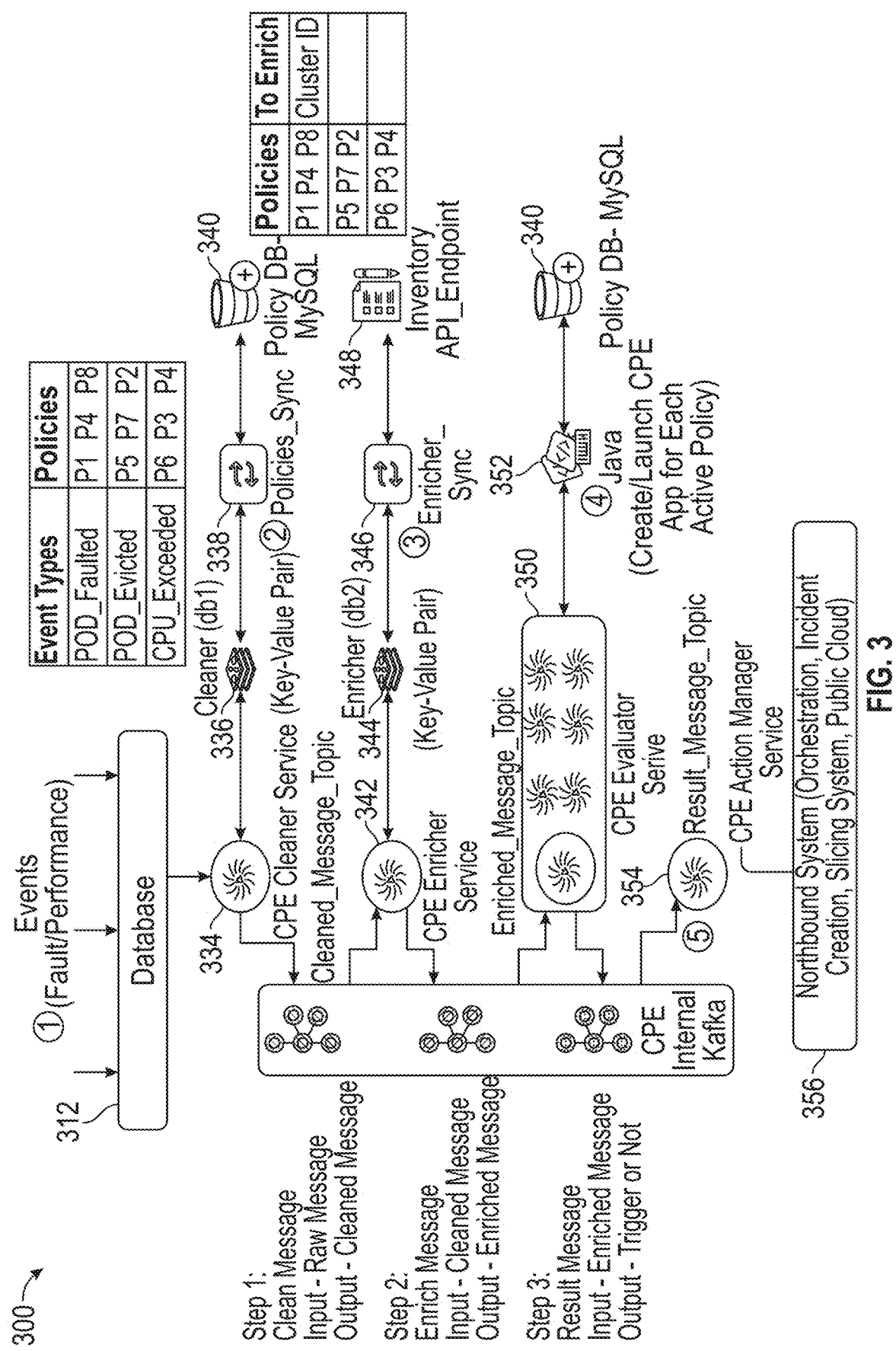
FIG. 3 is a pictorial diagram representation a correlation and policy engine (CPE), in accordance with some embodiments.

FIG. 3 is a pictorial diagram representation a correlation and policy engine (CPE) 300, in accordance with some embodiments.

Figure 4:
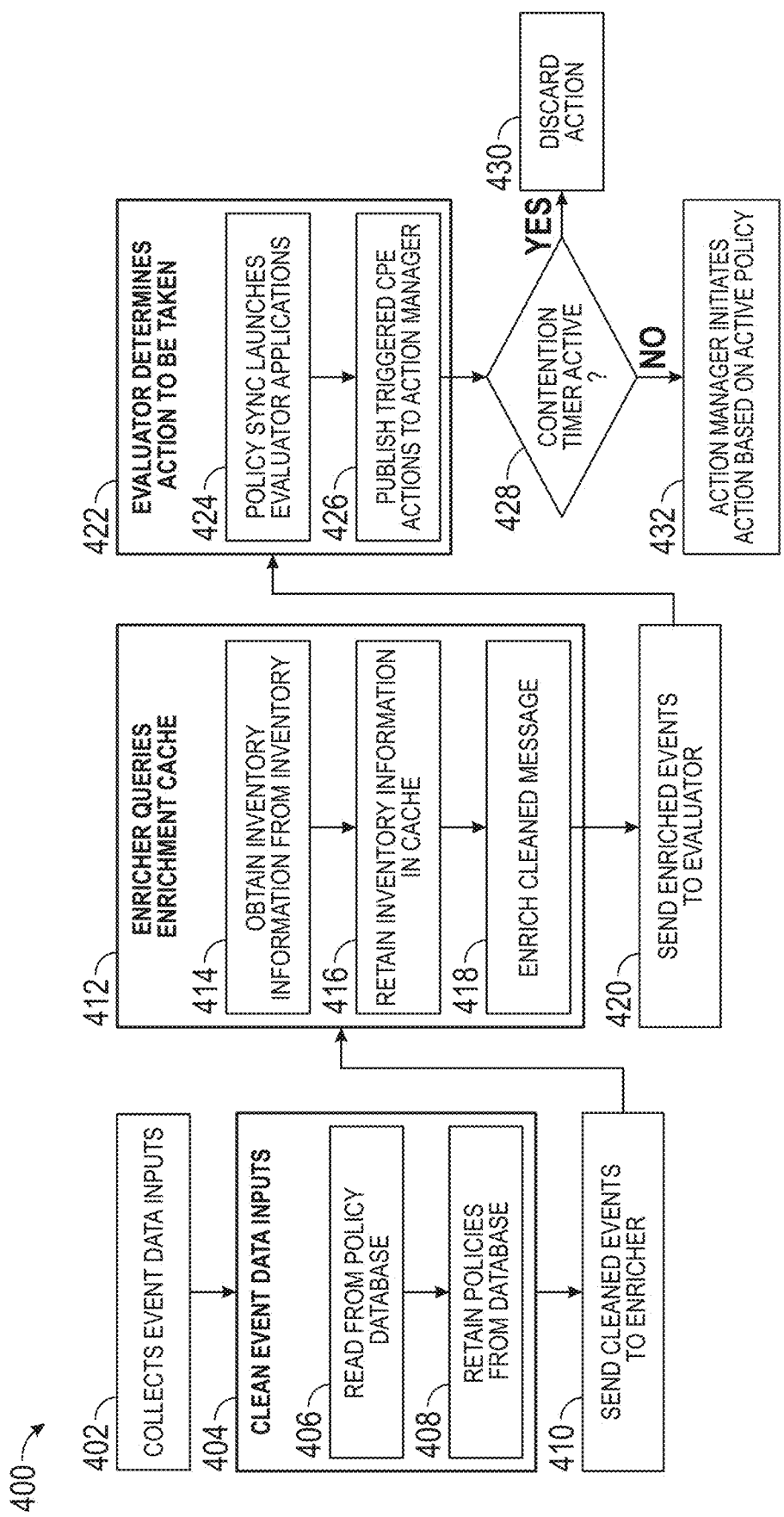
FIG. 4 is a flow diagram of a method for policy correlation and action management, in accordance with some embodiments.

FIG. 4 is a pictorial diagram representation of a method for implementing a correlation and policy engine (CPE) 400, in accordance with some embodiments.

FIGS. 3 and 4 are discussed together to provide an understanding of the operation of CPE 300 through method for implementing a correlation and policy engine (CPE) 400. In some embodiments, method for implementing a CPE 400 is a functional overview of a CPE, such as CPEs 300, 200, or 100. Method 400 is executed by processing circuitry 1102 discussed below with respect to FIG. 11. In some embodiments, some, or all the operations of method 400 are executed in accordance with instructions corresponding to instructions 1106 discussed below with respect to FIG. 11.

Method 400 includes operations 402-432, but the operations are not necessarily performed in the order shown. Operations are added, replaced, order changed, and/or eliminated as appropriate, in accordance with the spirit and scope of the embodiments. In some embodiments, one or more of the operations of method 400 are repeated. In some embodiments, unless specifically stated otherwise, the operations of method 400 are performed in order.

In some embodiments, CPE 300 analyzes, computes, enriches, and evaluates the collected events. In some embodiments, a user creates policy templates through a user interface (UI), such as UI 208 or UI 1118. The created policy filters the collected events, enriches the events (e.g., adds any related event data), correlates the enriched event and then processes the enriched event for action. In some embodiments, created policy templates are saved in a database as a draft where a user validates, activates, de-activates, edits, deletes, and other suitable modifications to policy templates within embodiments. In some embodiments, collected event data is missing parameters and these events are enriched with event data within an inventory so that processing is performed, and actions taken.

A user interface (UI), such as UI 208 or UI 1118, is the space where interactions between humans and machines occur. The goal of this interaction is to allow effective operation and control of the machine from the human end, while the machine simultaneously feeds back information that aids the operators' decision-making process. Non-limiting examples of UIs include the interactive aspects of computer operating systems, hand tools, heavy machinery operator controls, and process controls. UIs are composed of one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human-computer interface. Additional UI layers may interact with one or more human senses, including: tactile UI (touch), visual UI (sight), auditory UI (sound), olfactory UI (smell), equilibria UI (balance), and gustatory UI (taste).

A database is a structured collection of data. Databases are anything from a simple shopping list to a picture gallery or a place to hold vast amounts of information in a corporate network. A relational database is a digital store collecting data and organizing the collected data according to a relational model. In this model, tables consist of rows and columns, and relationships between data elements all following a logical structure. A relational database management system (RDBMS) is the set of software tools used to implement, manage, and query such a database.

A cache is a hardware or software component that stores data so that future requests for that data are served faster. The data stored in a cache might be the result of an earlier computation or a copy of data stored elsewhere. A cache hit occurs when the requested data is found in a cache, while a cache miss occurs when the cache is unable to be found. Cache hits are served by reading data from the cache, which is faster than recomputing a result or reading from a slower data store; thus, the more requests that are served from the cache, the faster the system performs.

An action is triggered based upon a matched policy. In some embodiments, a CPE core, such as processing circuitry 1102 of FIG. 11, logically evaluates and processes the collected events. In some embodiments, the CPE core identifies root causes, decides relevant actions pursuant to predetermined policies (discussed above) and instructs an action manager according to the predetermined network assurance policies. In some embodiments, the action manager collects the results of event processing and takes a respective action related to the collected result. In a non-limiting example, the action manage sends an email, sends a request to an application programming interface (API) endpoint, and other suitable actions within the embodiments. In some embodiments, the action manager obtains job status feedback to determine the status of the executed job and update a backend application at the database, so that users determine a status of the job through a UI.

An API is a connection between computers or between computer programs. An API is a type of software interface, offering a service to other pieces of software. An API specification is a document or standard that describes how to build or use such a connection or interface. A computer system that meets this standard is said to implement or expose an API. The term API refers either to the specification or to the implementation. In contrast to a UI, which connects a computer to a person, an API connects computers or pieces of software to each other. An API is not intended to be used directly by a person (e.g., the end user) other than a computer programmer who is incorporating the API into the software. An API is often made up of different parts which act as tools or services that are available to the programmer. A program or a programmer that uses one of these parts is said to call that portion of the API. The calls that make up the API are also known as subroutines, methods, requests, or endpoints.

Auto healing operation is triggered through CPE 300. In some embodiments, zero-touch network healing is implemented. In a non-limiting example, a user creates a network assurance policy through a UI for network healing (e.g., automatic fault resolution). Continuing with the non-limiting example, in response to a fault event being detected and filtered by CPE 300, the filtered fault activates the user created policy. Continuing with the non-limiting example, CPE 300 sends an enrichment request to an inventory for topology information of the affected network function. Continuing with the non-limiting example, CPE 300 sends requests to an orchestrator for a network function restart and CPE 300 updates the job status in a CPE UI, such as UI 208 or UI 1118. Continuing with the non-limiting example, based upon the status of the network function restart, a request is made of CPE 300 to take follow up action. For example, in response to the network function restart failing, then CPE 300 sends a request to the orchestrator for a network re-instantiate (e.g., to create again as an instance of a class). Continuing with the non-limiting example, the network re-instantiate request is sent to a cloud adapter that relays the status of the network re-instantiate and the CPE updates the job status in the CPE UI.

Thus, the automatic network healing proceeds from fault detection to fault repair, to repair verification, to status update all based upon a user predetermined policy.

Zero-touch provisioning (ZTP) is a method of setting up devices that automatically configures the device using a switch feature. ZTP helps IT teams quickly deploy network devices in a large-scale environment, eliminating most of the manual labor involved with adding them to a network. ZTP is found in devices and tools such as network switches, routers, wireless access points and firewalls. The goal is to enable IT personnel and network operators to install networking devices without manual intervention. Manual configuration takes time and is prone to human error especially with large amounts of devices being configured. ZTP is faster, reduces the chance of error and ensures configuration consistency. Zero-touch provisioning is also used to automate the system updating process. Using scripts, ZTP connects configuration management platforms and other tools for configuration or updates.

Network topology is the arrangement of elements (e.g., links, nodes, and other suitable elements within embodiments) of a communication network. Network topology is used to define or describe the arrangement of various types of telecommunication networks, including command and control radio networks, industrial fieldbuses, and computer networks. Network topology is the topological structure of a network and is depicted physically or logically. Topology is an application of graph theory wherein communicating devices are modeled as nodes and the connections between the devices are modeled as links or lines between the nodes. Physical topology is the placement of the various components of a network (e.g., device location and cable installation), while logical topology illustrates how data flows within a network.

In operation 402 of method 400, CPE 300 collects near real time performance and event data inputs. In some embodiments, event data inputs are cloud platform events, network application counters, container counters, internet events, public cloud events, fault and performance events or other suitable events within embodiments of the present disclosure. Database 312 accepts events from one or more sources and publishes the events using CPE input messages so that CPE cleaner 334 subscribes to the events and filters the corresponding events. Process flows from operation 402 to operation 404.

In operation 404 of method 400, CPE cleaner 334 filters unwanted events and passes the filtered events for further processing by message-policy cache 336 built by message-policy sync 338. In some embodiments, message-policy cache 336 is a remote dictionary server such as an in-memory data structure store, used as a distributed, in-memory key-value database, cache, and message broker, with optional durability. Message-policy cache 336 supports various types of abstract data structures, such as strings, lists, maps, sets, sorted sets, hyper-logs, bitmaps, streams, and spatial indices. Process flows from operation 404 to operation 406.

In operation 406 of method 400, message-policy sync 338 reads from policy database 340 the active policies in CPE 300 and creates an active policy cache in massage-policy cache 336 such that the policies with the same triggering event type are grouped together. Process flows from operation 406 to operation 408.

In operation 408 of method 400, message-policy cache 336 retains a cache of the network assurance policy information provided by message-policy sync 338. Thus, message-policy cache 336 retains real-time current policy information. Process flows from operation 408 to operation 410.

In operation 410 of method 400, CPE cleaner 334 publishes CPE cleaned messages (cleaned or filtered events) to CPE enricher 342. Process flows from operation 410 to operation 412.

In operation 412 of method 400, CPE enricher 342 enriches the cleaned message from CPE cleaner 334 with inventory information (e.g., filling in any missing parameters) to successfully execute a policy, by using message-enrichment cache 344 built by enricher sync 346. Process flows from operation 412 to operation 414.

In operation 414 of method 400, an enricher sync occurs where enricher sync 346 obtains inventory information from a policy-message enrichment database table (a database table in inventory 348 which has information about what inventory information is to be enriched for each message type) and save the information to message-enrichment cache 344. Thus, CPE enricher 342 quickly identifies whether an event needs enriching (i.e., adding missing data to the event). Process flows from operation 414 to operation 416.

In operation 416 of method 400, message-enrichment cache 344 retains a cache of the information provided by enricher sync 346. Process flows from operation 416 to operation 418.

In operation 418 of method 400, message-enrichment cache 344 enriches information (e.g., using the information from inventory 348) for each cleaned message from CPE cleaner 334. Process flows from operation 418 to operation 420.

In operation 420 of method 400, the enriched CPE messages are sent to CPE evaluator 350. Process flows from operation 420 to operation 422.

In operation 422 of method 400, CPE evaluator 350 performs CEP and determines whether an action is to be triggered based upon the enriched message or not. Process flows from operation 422 to operation 424.

In operation 424 of method 400, there is a CPE evaluator 350 created for each active policy template by policy CPE sync 352. Policy CPE sync 352 is the entity which creates and/or launches the one or more CPE evaluator applications 350 for each active policy. Process flows from operation 424 to operation 426.

In operation 426 of method 400, triggered CPE actions are published by CPE Evaluators 350. CPE action manager 354 is subscribed to the published CPE actions. Process flows from operation 426 to operation 428.

In operation 428 of method 400, a determination is made as to whether a contention timer is active. To avoid multiple actions for the same target for the same event, the contention timer controls the frequency of actions performed for targeted events. In some embodiments, a user sets a contention timer period (e.g., 60 minutes) where an action initiated during operation 426 of method 400 won't be acted upon or performed. The contention timer feature prevents an overload of actions from the policy manager, such as policy manager 210, towards northbound systems, such as the ticket creation system, email notification system, and orchestrator (LCM) systems within action manager 206 or northbound system 356. In response to the contention timer being active, any triggered action initiated at operation 426 is discarded at operation 430 of method 400. In response to the contention timer not being active, operation proceeds from operation 428 to operation 432.

In operation 432 of method 400, CPE action manger 354 initiates the API trigger to trigger an action which is based upon the CPE evaluator application 350 (e.g., based on the active policy template).

Figure 5:
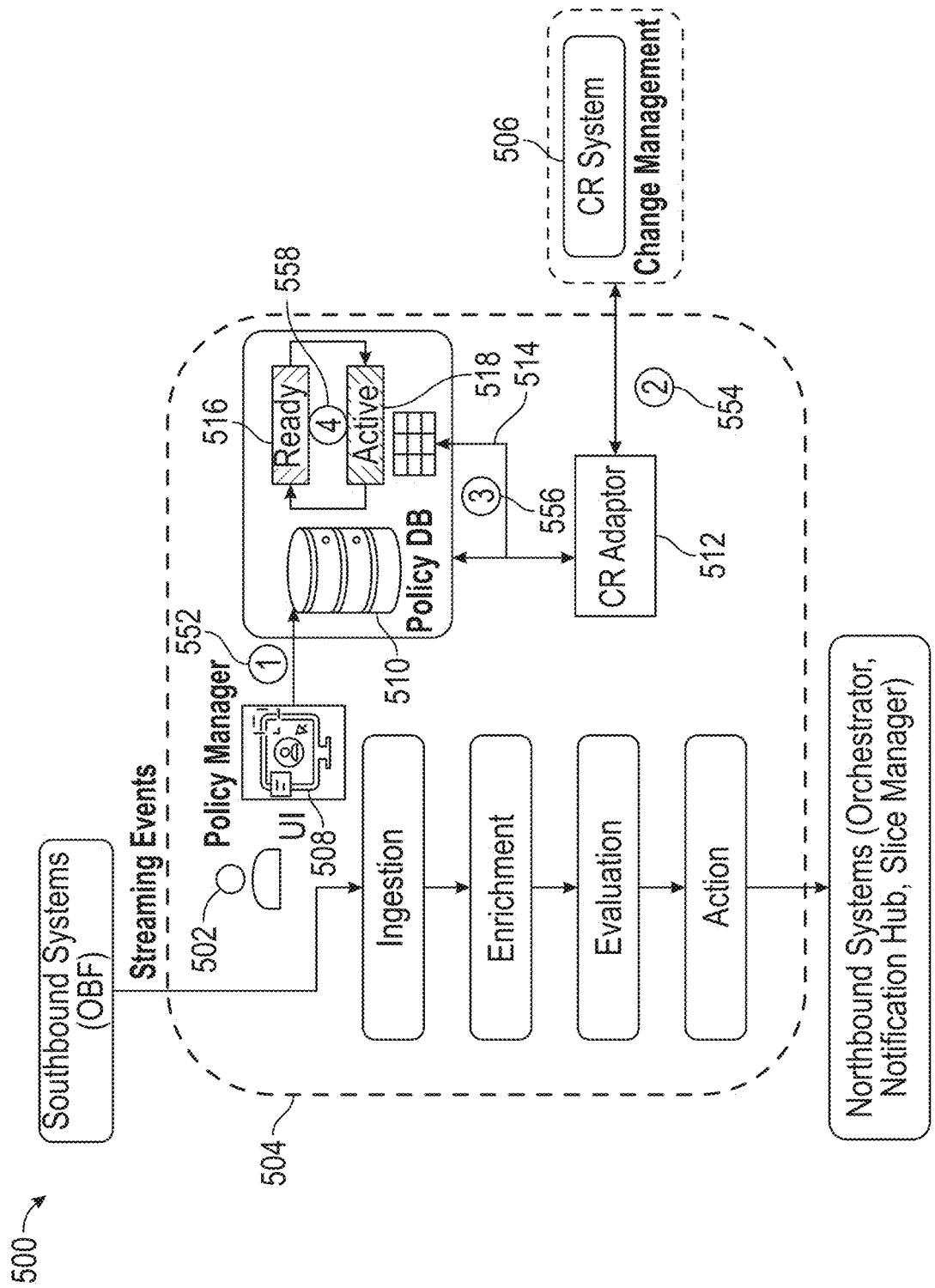
FIG. 5 is a block diagram of a method for change request (CR) assisted policy state management (CRAPS), in accordance with some embodiments.

FIG. 5 is a block diagram of a method for CR assisted policy state (CRAPS) management 500, in accordance with some embodiments.

Figure 6:
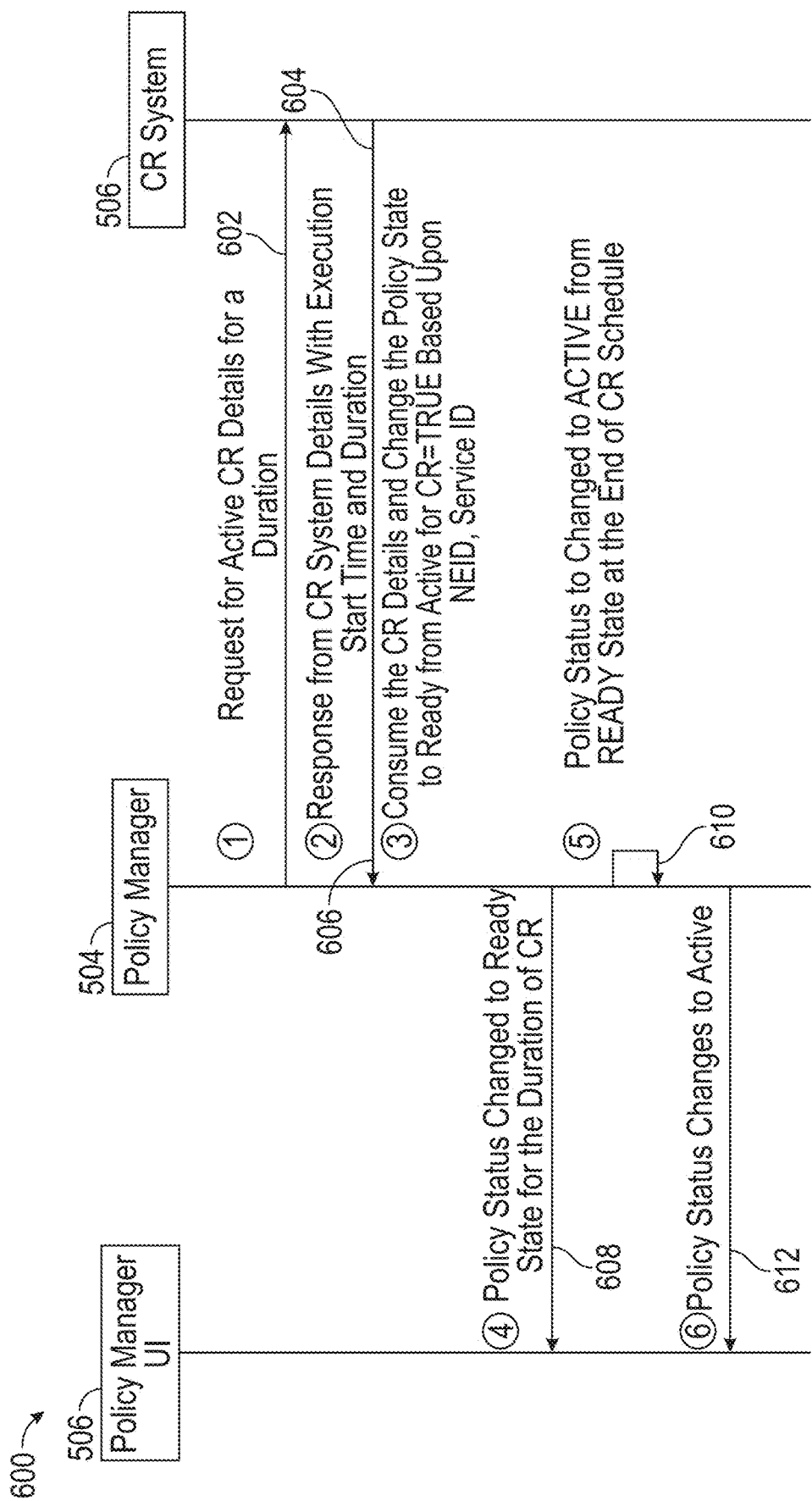
FIG. 6 is a data flow diagram of a method for change request (CR) assisted policy state management, in accordance with some embodiments.

FIGS. 5 and 6 are discussed together to provide an understanding of the operation of policy manager 504 and CR system 506 through CRAPS methods 500 and 600. In some embodiments, CRAPS method 500 is a functional overview of policy manager 504, such as policy managers 204, or 104. In some embodiments, CRAPS method 500 is executed by processing circuitry 1102 discussed below with respect to FIG. 11. In some embodiments, some, or all the operations of CRAPS method 500 are executed in accordance with instructions corresponding to instructions 1106 discussed below with respect to FIG. 11.

CRAPS method 500 includes operations 552-558, but the operations are not necessarily performed in the order shown. Operations are added, replaced, order changed, and/or eliminated as appropriate, in accordance with the spirit and scope of the embodiments. In some embodiments, one or more of the operations of CRAPS method 500 are repeated. In some embodiments, unless specifically stated otherwise, the operations of CRAPS method 500 are performed in order.

At operation 552 of CRAPS method 500, network assurance policies are created by a user 502 at UI 508 and stored in policy DB 510. In some embodiments, UI 508 is similar to UI 208 or UI 1118. In some embodiments, DB 510 is similar to DB 212, DB 340, or memory 1104. Process flows from operation 552 to operation 554.

At operation 554 of CRAPS method 500, CR adaptor 512 periodically fetches active CR details, as discussed in detail above. In some embodiments, the period is adjustable by a user. In some embodiments, the period is predetermined (e.g., every 24 hours, 12 hours, 1 hour, real time, or the like). Process flows from operation 554 to operation 556.

At operation 556 of CRAPS method 500, the fetched CR details are stored to an active scheduled CR table 514 (e.g., a list of active and scheduled CRs). In some embodiments, active scheduled CR table 514 stores CR events chronologically. That is, the next CR event in time is the first CR included in a first row of active scheduled CR table 514. In some embodiments, CR events are stored based upon importance, grouped based on a system the CR affects, or is stored alphabetically. Process flows from operation 556 to operation 558.

At operation 558 of CRAPS method 500, network assurance policy states are changed automatically, based upon active scheduled CR table 514. In some embodiments, active scheduled CR table 514 is maintained with policy ID, dependent NE, dependent NS, CR start date, and CR end date. In some embodiments, the time from the CR start date to the CR end date is the CR time window. In response to one or more network assurance policies, as pursuant to the policy ID, being true, (that is the network assurance policy affects a dependent NE or dependent NS) the network assurance policy is changed from an active state 516 to a ready state 518 at policy DB 510. In some embodiments, a CR flag is set, and active network assurance policy execution is skipped. In response to the CR time window closing (that is the date matches the CR end date) the network assurance policy state is again changed at the backend from ready state 518 to active state 516.

Thus, CRAPS method 500 provides for automatic CR execution while active policies, normally automatically acted upon, are skipped.

FIG. 6 is a data flow diagram of a method for change request (CR) assisted policy state management (CRAPS) 600, in accordance with some embodiments.

FIG. 6 is discussed to provide an understanding of the operation of policy manager 504 and CR system 506 through method for CRAPS method 600. In some embodiments, CRAPS method 600 is a functional overview of policy manager 504, such as policy managers 204, or 104. In some embodiments, CRAPS method 600 is executed by processing circuitry 1102 discussed below with respect to FIG. 11. In some embodiments, some, or all the operations of CRAPS method 600 are executed in accordance with instructions corresponding to instructions 1106 discussed below with respect to FIG. 11.

CRAPS method 600 includes operations 602-612, but the operations are not necessarily performed in the order shown. Operations are added, replaced, order changed, and/or eliminated as appropriate, in accordance with the spirit and scope of the embodiments. In some embodiments, one or more of the operations of CRAPS method 600 are repeated. In some embodiments, unless specifically stated otherwise, the operations of CRAPS method 600 are performed in order.

In some embodiments, CRAPS method 600 is complementary to CRAPS method 500. In some embodiments, CRAPS method 600 is further detail of CRAPS method 500. In some embodiments, CRAPS method 600 is an alternative means of performing CRAPS method 500.

At operation 602 of CRAPS method 600, policy manager 504 sends a request for active CR details, including a CR duration (e.g., time window), from CR system 506 which is configured to function similar to the CR systems described above. Process flows from operation 602 to operation 604.

At operation 604 of CRAPS method 600, policy manager 504 receives a response from CR system 506 that includes details with CR execution start time and CR duration (e.g., CR time window). Process flows from operation 604 to operation 606.

At operation 606 of CRAPS method 600, policy manger 504 processes and stores the CR details received in operation 604. A network assurance policy state is changed to ready from active in response to one or more CRs being active based upon a dependent NE ID or a dependent NS ID. Process flows from operation 606 to operation 608.

At operation 608 of CRAPS method 600, policy manager 504 sends a network assurance policy status change to UI 506 notifying user 502 the network assurance policy state has changed from active to ready for the duration of the CR. Process flows from operation 608 to operation 610.

At operation 610 of CRAPS method 600, policy manger 504 changes the network assurance policy status back from ready state to active state at the end of the CR time window. Process flows from operation 610 to operation 612.

At operation 612 of CRAPS method 600, policy manager 504 sends a policy status change to UI 506 notifying user 502 the network assurance policy state has been changed from ready to active.

Figure 7:
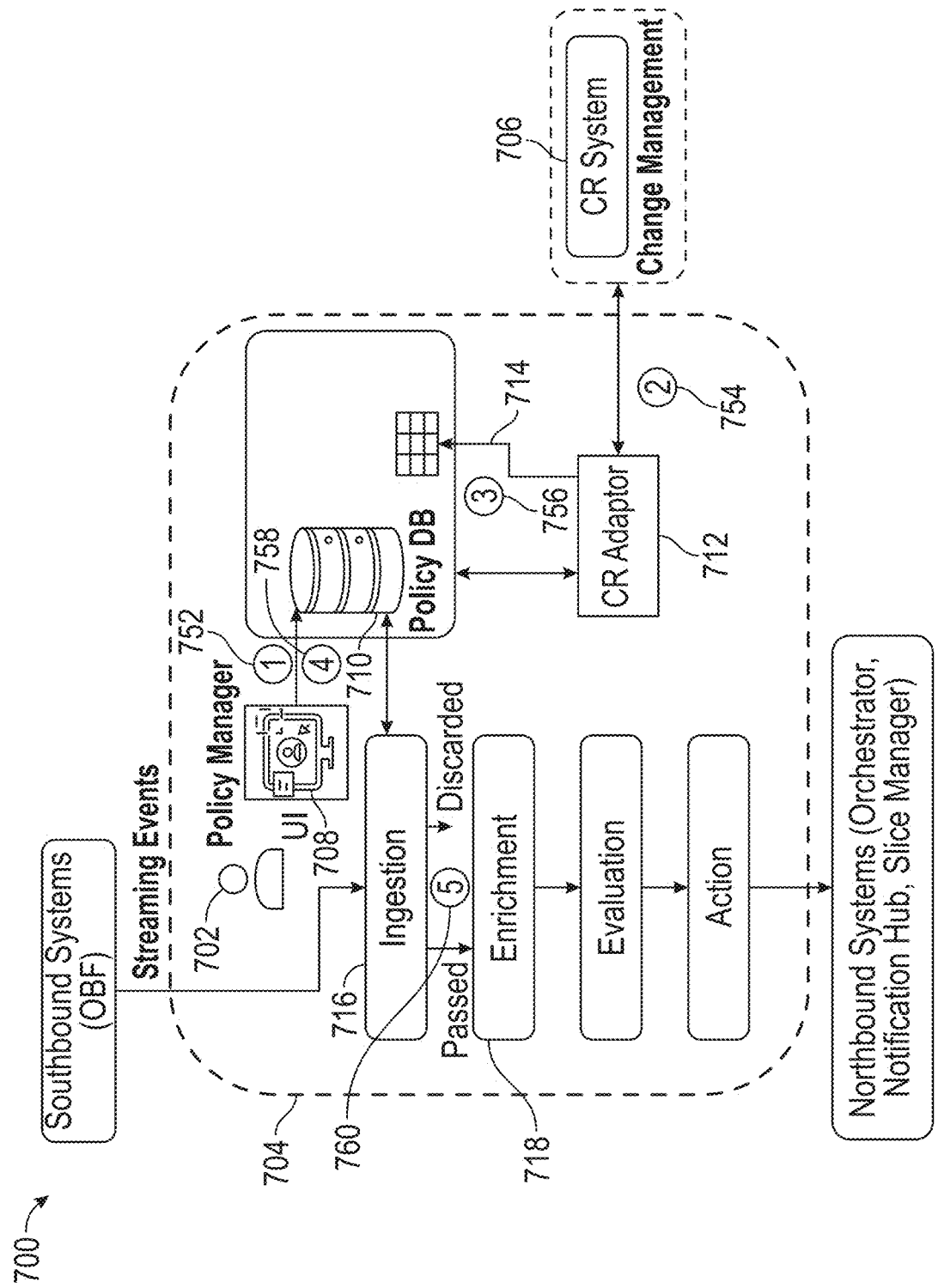
FIG. 7 is a block diagram of a method for policy onboarding unification (POU), in accordance with some embodiments.

FIG. 7 is a block diagram of a method for policy onboarding unification (POU) 700, in accordance with some embodiments.

Figure 8:
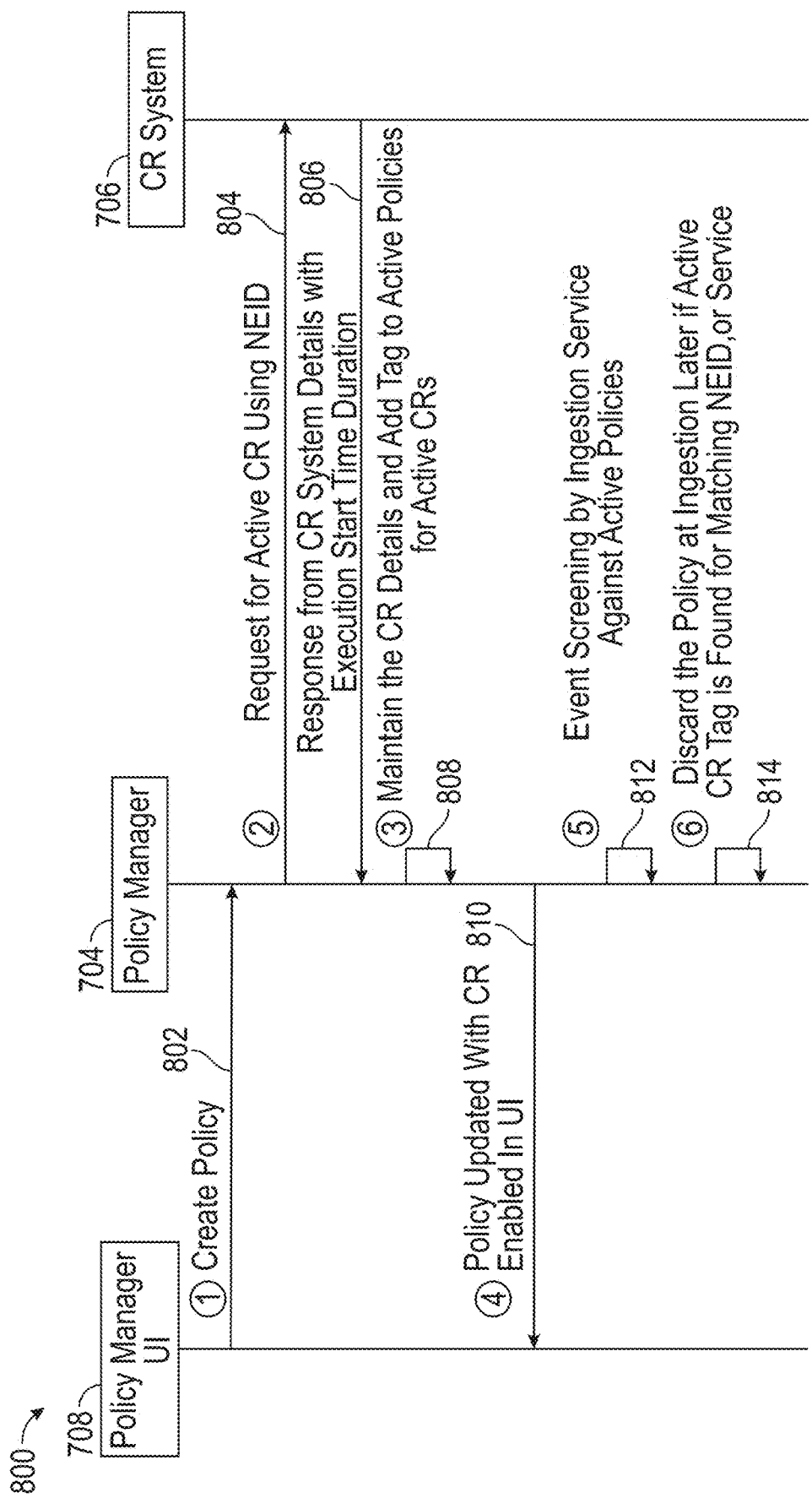
FIG. 8 is a data flow diagram of a method for policy onboarding unification (POU), in accordance with some embodiments.

FIGS. 7 and 8 are discussed together to provide an understanding of the operation of policy manager 704 and CR system 706 through POU method 700 and 800. In some embodiments, POU method 700 is a functional overview of policy manager 704, such as policy managers 504, 204, or 104. In some embodiments, POU method 700 is executed by processing circuitry 1102 discussed below with respect to FIG. 11. In some embodiments, some, or all the operations of POU method 700 are executed in accordance with instructions corresponding to instructions 1106 discussed below with respect to FIG. 11.

POU method 700 includes operations 752-760, but the operations are not necessarily performed in the order shown. Operations are added, replaced, order changed, and/or eliminated as appropriate, in accordance with the spirit and scope of the embodiments. In some embodiments, one or more of the operations of POU method 700 are repeated. In some embodiments, unless specifically stated otherwise, the operations of POU method 700 are performed in order.

At operation 752 of POU method 700, network assurance policies are created by a user 702 at UI 708 and stored in policy DB 710. In some embodiments, UI 708 is similar to UI 208, UI 508, and/or UI 1118. In some embodiments, DB 710 is similar to DB 510, DB 212, DB 340, and/or memory 1104. Process flows from operation 752 to operation 754.

At operation 754 of POU method 700, CR adaptor 712 periodically fetches active CR details, as discussed in detail above. Process flows from operation 754 to operation 756.

At operation 756 of POU method 700, the fetched CR details are stored to an active scheduled CR table 714. In some embodiments, active scheduled CR table 714 stores the CR events chronologically. That is, the next CR event in time is the first CR included in a first row of active scheduled CR table 714. In some embodiments, the CR events are stored based upon importance, grouped based on a system the CR affects, or is stored alphabetically. Process flows from operation 756 to operation 758.

At operation 758 of POU method 700, ingestion service 716, while screening incoming event streams against active policies, screens active scheduled CR table 714 created in process 756. In some embodiments, ingestion service 716 is similar to event sources 102 in combination with cleaner 116 and/or CPE cleaner service 334. In some embodiments, active scheduled CR table 714 is maintained with policy ID, dependent NE, dependent NS, CR start date, and CR end date. Process flows from operation 758 to operation 760.

At operation 760 of POU method 700, incoming events with matching dependent NE and/or dependent NS including an active CR are discarded before sending the events to enrichment service 718 during the CR time window. In some embodiments, enrichment service 718 is similar to enricher 118 or CPE enricher service 342.

In contrast to CRAPS methods 500 and 600 where the policy state for network assurance policies is changed from active to ready for the dependent NEs and dependent NSs which are implementing a CR, method 700 discards the event message at ingestion service 716 for the dependent NEs and dependent NSs and no change of state from active to ready occurs.

FIG. 8 is a data flow diagram of a method for policy onboarding unification (POU) 800, in accordance with some embodiments.

FIG. 8 is discussed to provide an understanding of the operation of policy manager 704 and CR system 706 through POU method 800. In some embodiments, POU method 800 is a functional overview of policy manager 704, such as policy managers, 504, 204, and 104. In some embodiments, POU method 800 is executed by processing circuitry 1102 discussed below with respect to FIG. 11. In some embodiments, some, or all the operations of POU method 800 are executed in accordance with instructions corresponding to instructions 1106 discussed below with respect to FIG. 11.

POU method 800 includes operations 802-812, but the operations are not necessarily performed in the order shown. Operations are added, replaced, order changed, and/or eliminated as appropriate, in accordance with the spirit and scope of the embodiments. In some embodiments, one or more of the operations of POU method 800 are repeated. In some embodiments, unless specifically stated otherwise, the operations of POU method 800 are performed in order.

In some embodiments, POU method 800 is complementary to POU method 700. In some embodiments, POU method 800 is further detail of POU method 700. In some embodiments, POU method 800 is an alternative means of expressing POU method 700.

At operation 802 of POU method 800, user 702 creates one or more network assurance policies at UI 708 and the one or more network assurance policies are received at policy manager 704. Process flows from operation 802 to operation 804.

At operation 804 of POU method 800, policy manager 704 sends a request for one or more active CRs, using the NE ID, from CR system 706 which is configured to function similar to the CR systems described above. Process flows from operation 804 to operation 806.

At operation 806 of POU method 800, policy manager 704 receives a response from CR system 706 that includes details with CR execution start time and CR duration (e.g., CR time window). Process flows from operation 806 to operation 808.

At operation 808 of POU method 800, policy manger 704 processes and stores the CR details received in operation 806. Policy manager 704 further adds a tag to active network assurance policies based upon active CRs. In a non-limiting example, all network assurance polices affecting a dependent NE or dependent NS are tagged to indicate that an active CR is scheduled to the same dependent NE or dependent NS. Process flows from operation 808 to operation 810.

At operation 810 of POU method 800, policy manager 704 updates the network assurance policy to reflect the network assurance policy is CR enabled (e.g., the network assurance policy is dependent upon an active CR meaning the network assurance policy is discarded during a CR) and sends this update to UI 706 notifying user 702. Process flows from operation 810 to operation 812.

At operation 812 of POU method 800, policy manger 704 begins event screening by ingestion service 716 against tagged network assurance policies. Process flows from operation 812 to operation 814.

At operation 814 of CRPM method 800, ingestion service 716 discards tagged network assurance policies in response to an active CR tag being found for matching NE ID or NS ID.

Figure 9:
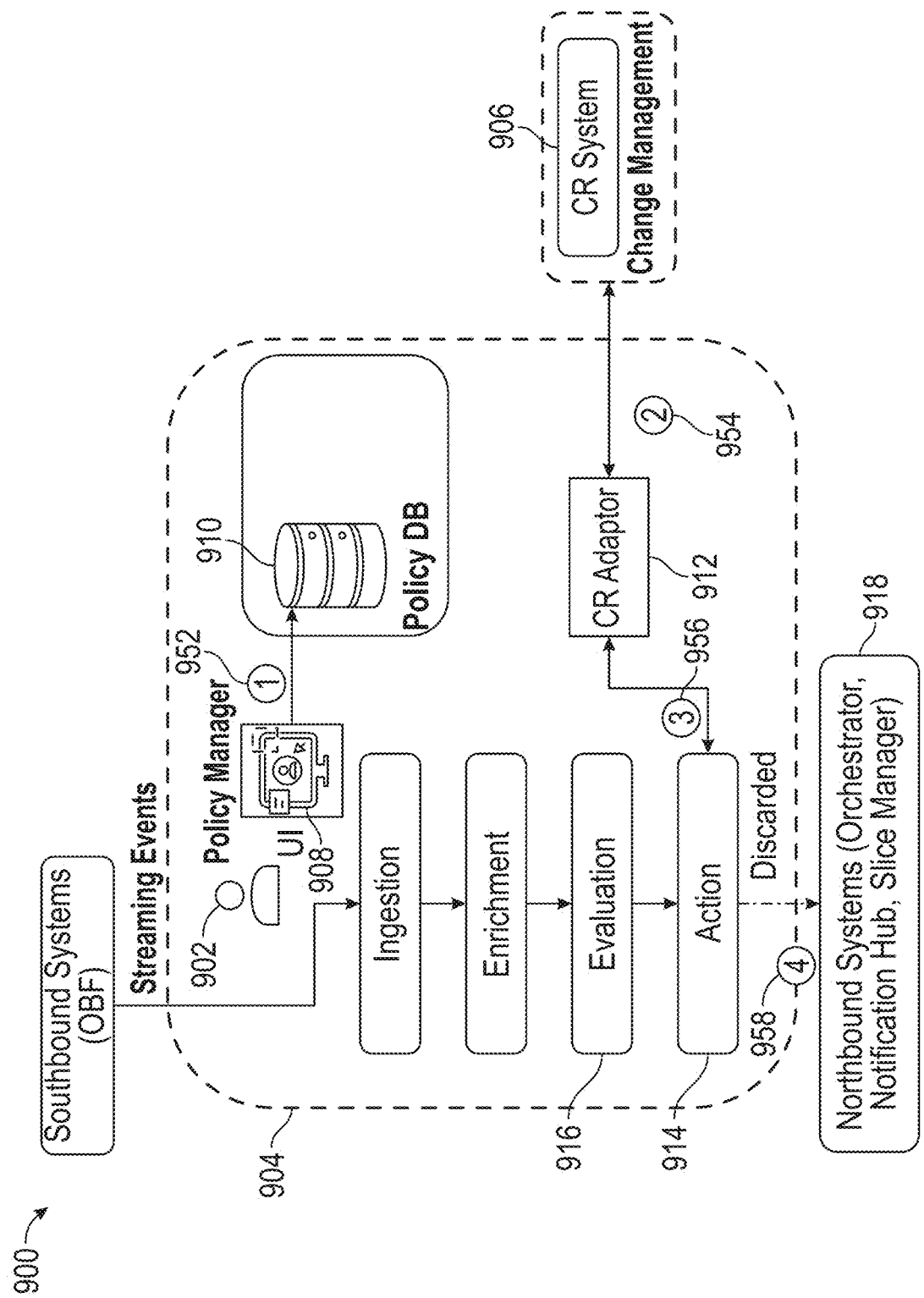
FIG. 9 is a block diagram of a method for policy onboarding unification (POU), in accordance with some embodiments.

FIG. 9 is a block diagram of a method for policy onboarding unification (POU) 900, in accordance with some embodiments.

Figure 10:
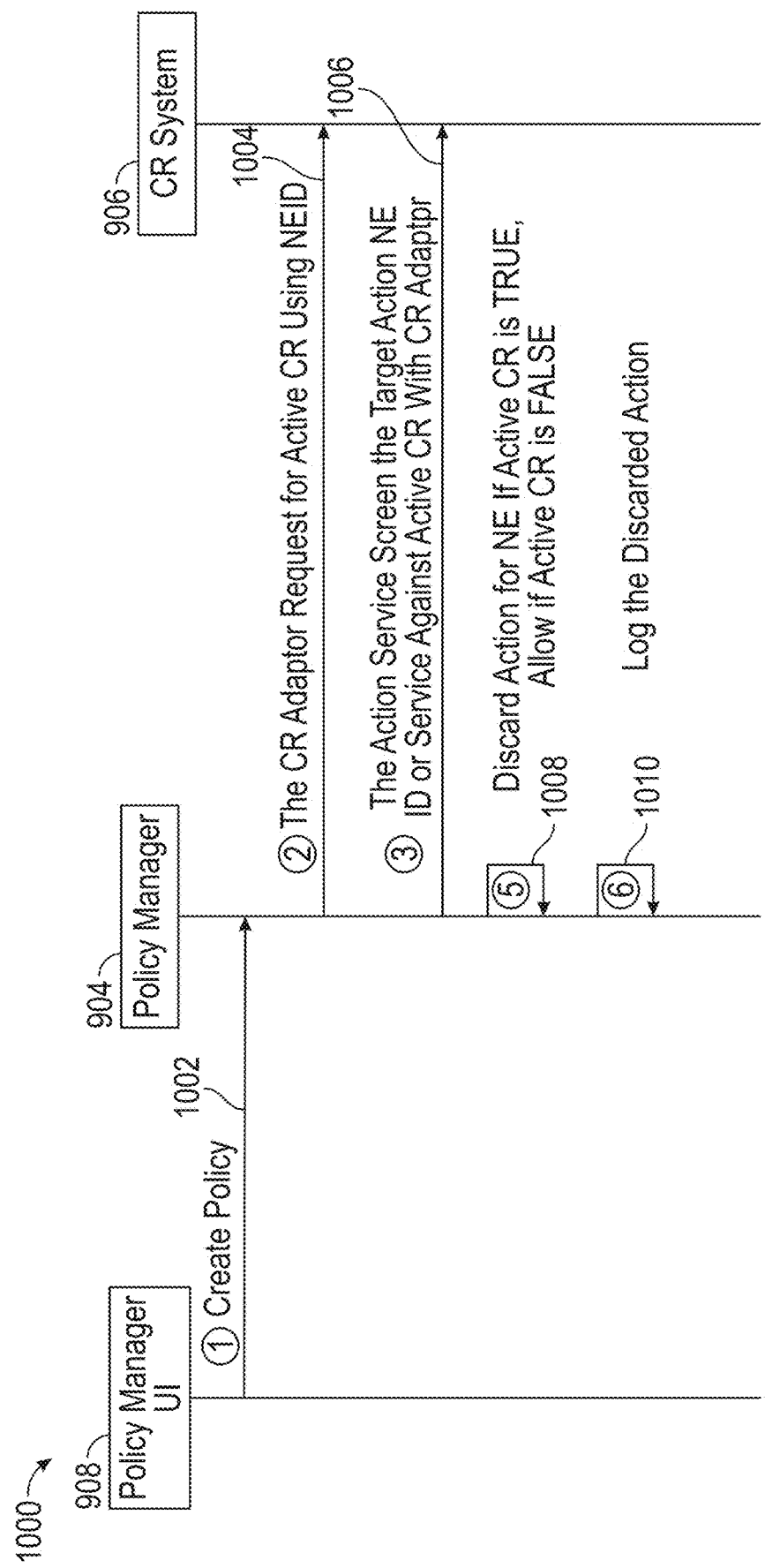
FIG. 10 is a data flow diagram of a method for policy onboarding unification, in accordance with some embodiments.

FIGS. 9 and 10 are discussed together to provide an understanding of the operation of policy manager 904 and CR system 906 through POU method 900 and 1000. In some embodiments, POU method 900 is a functional overview of policy manager 904, such as policy managers 704, 504, 204, and 104. In some embodiments, POU method 900 is executed by processing circuitry 1102 discussed below with respect to FIG. 11. In some embodiments, some, or all the operations of POU method 900 are executed in accordance with instructions corresponding to instructions 1106 discussed below with respect to FIG. 11.

POU method 900 includes operations 952-958, but the operations are not necessarily performed in the order shown. Operations are added, replaced, order changed, and/or eliminated as appropriate, in accordance with the spirit and scope of the embodiments. In some embodiments, one or more of the operations of POU method 900 are repeated. In some embodiments, unless specifically stated otherwise, the operations of POU method 900 are performed in order.

At operation 952 of POU method 900, network assurance policies are created by a user 902 at UI 908 and stored in policy DB 910. In some embodiments, UI 908 is similar to UI 708, 508, 208, and UI 1118. In some embodiments, DB 910 is similar to DB 710, DB 510, DB 212, DB 340, or memory 1104. Process flows from operation 952 to operation 954.

At operation 954 of POU method 900, CR adaptor 912 interacts with CR system 906 in real time (e.g., understood to be in the order of milliseconds, and sometimes microseconds). Process flows from operation 954 to operation 956.

At operation 956 of POU method 900, action service 914 screens incoming event streams from evaluated service 916 with one or more active CRs in real time based upon inputs from CR adaptor 912. The screening occurs before action service 914 triggers actions based upon the network assurance policies. In some embodiments, action service 914 is similar to trigger 122, action manager 230, and CPE action manager service 354. In some embodiments, evaluated service 916 is similar to evaluator 120, policy correlation and evaluation 226, and CPE evaluator service 350. In some embodiments, the real time event screening is enabled based on one or more of: policy ID, dependent NE, dependent NS, CR start date, or CR end date. Process flows from 956 to 958.

At operation 958 of POU method 900, incoming events at action service 914 that match a dependent NE or dependent NS with an active CR are discarded. This action is taken to avoid fault repair actions during the CR time window. In some embodiments, the CR scanning/filtering is enabled before triggering an action towards northbound systems 918.

In contrast to POU methods 700 and 800, POU method 900 screens the incoming events at action service 914 before any triggering action occurs. Whereas POU methods 700 and 800 perform the screening action at ingestion service 716. In some embodiments, the screening/filtering action occurs at evaluation service 916 and in some embodiments, the screening/filtering action occurs at enrichment service 718.

FIG. 10 is a data flow diagram of a method for policy onboarding unification 100, in accordance with some embodiments.

FIG. 10 is discussed to provide an understanding of the operation of policy manager 904 and CR system 906 through POU method 1000. In some embodiments, POU method 1000 is a functional overview of policy manager 904, such as policy managers, 704, 504, 204, or 104. In some embodiments, POU method 1000 is executed by processing circuitry 1102 discussed below with respect to FIG. 11. In some embodiments, some, or all the operations of POU method 1000 are executed in accordance with instructions corresponding to instructions 1106 discussed below with respect to FIG. 11.

POU method 1000 includes operations 1002-1010, but the operations are not necessarily performed in the order shown. Operations are added, replaced, order changed, and/or eliminated as appropriate, in accordance with the spirit and scope of the embodiments. In some embodiments, one or more of the operations of POU method 1000 are repeated. In some embodiments, unless specifically stated otherwise, the operations of POU method 1000 are performed in order.

In some embodiments, POU method 1000 is complementary to POU method 900. In some embodiments, POU method 1000 is further detail of POU method 900. In some embodiments, POU method 1000 is an alternative means of expressing POU method 900.

At operation 1002 of POU method 1000, user 902 creates one or more network assurance policies and sends the network assurance policies to policy manager 904. In some embodiments, the network assurance policies are similar to those described above. Process flows from operation 1002 to operation 1004.

At operation 1004 of POU method 1000, policy manager 904 sends a request for active CR details based on a NE ID from CR system 506, which is configured to function similar to the CR systems described above. Process flows from operation 1004 to operation 1006.

At operation 1006 of POU method 1000, policy manager 904 receives instructions from CR system 906 to have action service 914 screen one or more target action NE IDs or NS IDs against active CRs based upon real time input from CR adaptor 912. Process flows from operation 1006 to operation 1008.

At operation 1008 of POU method 1000, action service 914 discards network assurance policy actions for a NE or NS in response to a CR being active or true and allows the network assurance policy actions for a NE or NS in response to a CR being inactive or false. Process flows from operation 1008 to operation 1010.

At operation 1010 of POU method 1000, the one or more discarded network assurance policy actions are logged (recorded). In a non-limiting example, the recorded discarded network assurance policy actions are used for troubleshooting at a later time or are used to perform fault repair at a time after the CR duration time window.

FIG. 11 is a block diagram of CPE system 1100 in accordance with some embodiments. In some embodiments, CPE system 1100 is a general-purpose computing device including a hardware processing circuitry 1102 and a non-transitory, computer-readable storage medium 1104. Storage medium 1104, amongst other things, is encoded with, i.e., stores, computer instructions 1106, i.e., a set of executable instructions such as a correlation engine and policy manager. Execution of instructions 1106 by hardware processing circuitry 1102 represents (at least in part) a CPE tool which implements a portion or all the methods, such as methods 400, 500, 600, 700, 800, 900, and 1000, described herein in accordance with one or more embodiments (hereinafter, the noted processes and/or methods).

Hardware processing circuitry 1102 is electrically coupled to a computer-readable storage medium 1104 via a bus 1108. Hardware processing circuitry 1102 is further electrically coupled to an I/O interface 1110 by bus 1108. A network interface 1112 is further electrically connected to processing circuitry 1102 via bus 1108. Network interface 1112 is connected to a network 1114, so that processing circuitry 1102 and computer-readable storage medium 1104 connect to external elements via network 1114. Processing circuitry 1102 is configured to execute computer instructions 1106 encoded in computer-readable storage medium 1104 in order to cause CPE system 1100 to be usable for performing the noted processes and/or methods, such as methods 400, 500, 600, 700, 800, 900, and 1000, of FIGS. 4, 5, 6, 7, 8, 9, and 10. In one or more embodiments, processing circuitry 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 1104 includes a compact disk-read memory (CD-ROM), a compact disk-read/write (CD-R/W), and/or a digital video disc (DVD).

In one or more embodiments, storage medium 1104 stores computer instructions 1106 configured to cause CPE system 1100 to be usable for performing a portion or the noted processes and/or methods. In one or more embodiments, storage medium 1104 further stores information, such as a correlation and policy engine which facilitates performing the noted processes and/or methods.

CPE system 1100 includes I/O interface 1110 that is like UI 208. I/O interface 1110 is coupled to external circuitry. In one or more embodiments, I/O interface 1110 includes a keyboard, keypad, mouse, trackball, trackpad, touchscreen, cursor direction keys and/or other suitable I/O interfaces are within the contemplated scope of the disclosure for communicating information and commands to processing circuitry 1102.

CPE system 1100 further includes network interface 1112 coupled to processing circuitry 1102. Network interface 1112 allows CPE system 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, are implemented in two or more CPE system 1100.

CPE system 1100 is configured to receive information through I/O interface 1110. The information received through I/O interface 1110 includes one or more of instructions, data, and/or other parameters for processing by processing circuitry 1102. The information is transferred to processing circuitry 1102 via bus 1108. CPE system 1100 is configured to receive information related to a UI through I/O interface 1110. The information is stored in computer-readable medium 1104 as user interface (UI) 208.

In some embodiments, the noted processes and/or methods are implemented as a standalone software application for execution by processing circuitry. In some embodiments, the noted processes and/or methods are implemented as a software application that is a part of an additional software application. In some embodiments, the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system includes processing circuitry; and a memory connected to the processing circuitry, wherein the memory is configured to store executable instructions that, in response to being executed by the processing circuitry, facilitate performance of operations to receive, from a user interface (UI), one or more network assurance policies configured to be used in a correlation and policy engine (CPE); store, by the processing circuitry, the one or more network assurance policies in a database (DB); receive, periodically from a change request (CR) adaptor service, one or more active CRs configured to be implemented; store, by the processing circuitry, the one or more active CRs to an active scheduled CR table; and modify, by the processing circuitry, one or more network assurance policy states based on a CR time window that includes a CR start date and a CR end date for each network assurance policy.

In some embodiments, the executable instructions that, in response to being executed by the processing circuitry, further facilitate performance of operations to send, by the processing circuitry, a request to a CR system for one or CR time windows based upon the one or more active CRs.

In some embodiments, the executable instructions that, in response to being executed by the processing circuitry, further facilitate performance of operations to receive, by the processing circuitry, a response from the CR system that includes information for the one or more active CRs including a CR execution start time and the CR time window.

In some embodiments, the modifying the one or more network assurance policy states based on the CR time window includes change, from an active state to a ready state, each network assurance policy state that is directed to a dependent network element (NE) or a dependent network service (NS) affected by an active CR during implementation of the active CR.

In some embodiments, the modifying the one or more network assurance policy states based on the CR time window includes change, from a ready state to an active state, the each network assurance policy state directed to the dependent NE or the dependent NS in response to the CR time window expiring.

In some embodiments, the executable instructions that, in response to being executed by the processing circuitry, further facilitate performance of operations to send, by the processing circuitry, a notification to the UI that includes information regarding each network assurance policy modification.

In some embodiments, the storing the one or more active CRs to the active scheduled CR table includes store, by the processing circuitry, to the active scheduled CR table one or more of the following, a network assurance policy identification (ID); a dependent NE to be affected by an active CR; a dependent NS to be affected by the active CR; the CR start date; and the CR end date.

In some embodiments, the executable instructions that, in response to being executed by the processing circuitry, further facilitate performance of operations to defer, by the processing circuitry, during performance of a CR on a dependent NE or a dependent NS each network assurance policy automated action trigger that is configured to, in response to being executed by the processing circuitry, act on a detected fault.

In some embodiments, a method executed by processing circuitry, includes receiving, from a user interface (UI), one or more network assurance policies configured to be used in a correlation and policy engine (CPE); receiving, periodically from a change request (CR) adaptor service, one or more active change requests (CRs) configured to be implemented; storing the one or more active CRs to an active scheduled CR table included in a network assurance policy database (DB); filtering, by an ingestion service of the CPE that screens incoming event streams based on the one or more network assurance policies, further the incoming event streams based on the active CRs within the active scheduled CR table; and discarding each incoming event from the incoming event streams that matches a dependent network element (NE) or a dependent network service (NS) that is within a CR time window where the CR time window is a period of time where a CR is being implemented.

In some embodiments, the filtering the incoming event streams based on the active CRs within the active scheduled CR table includes screening the incoming event streams against the active scheduled CR table based on one or more of, a network assurance policy identification (ID); the dependent NE to be affected by an active CR; the dependent NS to be affected by the active CR; a CR start date; and a CR end date.

In some embodiments, the method further includes requesting, from a CR system operably coupled to the CR adaptor service, one or more active CRs based on one or more NE identifications (IDs).

In some embodiments, the method further includes receiving from the CR system a CR execution start time and CR duration for each active CR.

In some embodiments, the method further includes adding a CR tag to each network assurance policy that matches the dependent NE or the dependent NS.

In some embodiments, the method further includes sending a notification to the UI that includes information regarding each network assurance policy modification with the CR tag.

In some embodiments, the method further includes storing the one or more network assurance policies in the network assurance policy DB.

In some embodiments, a non-transitory, tangible computer readable storage medium storing a computer program, wherein the computer program contains instructions that in response to being executed, cause processing circuitry to perform operations to, receive, from a user interface (UI), one or more network assurance policies configured to be used in a correlation and policy engine (CPE); store the one or more network assurance policies in a network assurance policy DB; filter, by an action service of the CPE that screens incoming event streams based on each active CR received, periodically from a change request (CR) adaptor service; and discard each incoming event from the incoming event streams that matches a dependent network element (NE) or a dependent network service (NS) that is within a CR time window where the CR time window is a period where a CR is being implemented.

In some embodiments, the instructions that in response to being executed, cause the processing circuitry to perform operations to, request, from a CR system, one or more active CRs based on one or more NE identifications (IDs).

In some embodiments, the instructions that in response to being executed, cause the processing circuitry to perform operations to, receive, from the CR adaptor service operably coupled to the CR system, the one or more active CRs before the filtering by the action service.

In some embodiments, the filtering, by the action service of the CPE that screens the incoming event streams based on the each active CR received, periodically from the CR adaptor service includes perform the filtering in real time based upon one or more of, a network assurance policy identification (ID); a dependent NE to be affected by an active CR; a dependent NS to be affected by the active CR; a CR start date; and a CR end date.

In some embodiments, the instructions that in response to being executed, cause the processing circuitry to perform operations to, log each discarded incoming event from the incoming event streams that matches the dependent NE or the dependent NS that is within the CR time window.

The foregoing outlines features of several embodiments so that those skilled in the art better understand the embodiments. Those skilled in the art appreciate that ready use of the present disclosure as a basis for designing or modifying other processes and structures for carrying out the same purposes and/or achieving the same advantages of the embodiments introduced herein. Those skilled in the art further realize that such equivalent constructions do not depart from the spirit and scope of the embodiments, and that various changes, substitutions, and alterations do not depart from the spirit and scope of the embodiments.

What is claimed is:

1. A method executed by processing circuitry, comprising:
   receiving, from a user interface (UI), one or more network assurance policies configured to be used in a correlation and policy engine (CPE);
   receiving, periodically from a change request (CR) adaptor service, one or more active change requests (CRs) configured to be implemented;
   storing the one or more active CRs to an active scheduled CR table included in a network assurance policy database (DB);
   filtering, by an ingestion service of the CPE that screens incoming event streams based on the one or more network assurance policies, further the incoming event streams based on the active CRs within the active scheduled CR table; and
   discarding each incoming event from the incoming event streams that matches a dependent network element (NE) or a dependent network service (NS) that is within a CR time window where the CR time window is a period of time where a CR is being implemented.

2. The method of claim 1, wherein the filtering the incoming event streams based on the active CRs within the active scheduled CR table comprises:
   screening the incoming event streams against the active scheduled CR table based on one or more of:
   a network assurance policy identification (ID);
   the dependent NE to be affected by an active CR;
   the dependent NS to be affected by the active CR;
   a CR start date; and
   a CR end date.

3. The method of claim 1, further comprising:
   request, from a CR system operably coupled to the CR adaptor service, one or more active CRs based on one or more NE identifications (IDs).

4. The method of claim 3, further comprising:
   receiving from the CR system a CR execution start time and CR duration for each active CR.

5. The method of claim 1, further comprising:
   adding a CR tag to each network assurance policy that matches the dependent NE or the dependent NS.

6. The method of claim 5, further comprising:
   sending a notification to the UI that includes information regarding each network assurance policy modification with the CR tag.

7. The method of claim 1, further comprising:
   storing the one or more network assurance policies in the network assurance policy DB.

8. A non-transitory, tangible computer readable storage medium storing a computer program, wherein the computer program contains instructions that in response to being executed, cause processing circuitry to perform operations to:
   receive, from a user interface (UI), one or more network assurance policies configured to be used in a correlation and policy engine (CPE);
   store the one or more network assurance policies in a network assurance policy DB;
   filter, by an action service of the CPE that screens incoming event streams based on each active CR received, periodically from a change request (CR) adaptor service; and
   discard each incoming event from the incoming event streams that matches a dependent network element (NE) or a dependent network service (NS) that is within a CR time window where the CR time window is a period where a CR is being implemented.

9. The non-transitory, tangible computer readable storage medium of claim 8, wherein the instructions that in response to being executed, cause the processing circuitry to perform operations to:
   request, from a CR system, one or more active CRs based on one or more NE identifications (IDs).

10. The non-transitory, tangible computer readable storage medium of claim 9, wherein the instructions that in response to being executed, cause the processing circuitry to perform operations to:
    receive, from the CR adaptor service operably coupled to the CR system, the one or more active CRs before the filtering by the action service.

11. The non-transitory, tangible computer readable storage medium of claim 8, wherein the filtering, by the action service of the CPE that screens the incoming event streams based on the each active CR received, periodically from the CR adaptor service comprises:
    perform the filtering in real time based upon one or more of:
    a network assurance policy identification (ID);
    a dependent NE to be affected by an active CR;

a dependent NS to be affected by the active CR;
a CR start date; and
a CR end date.

12. The non-transitory, tangible computer readable storage medium of claim 8, wherein the instructions that in response to being executed, cause the processing circuitry to perform operations to:
log each discarded incoming event from the incoming event streams that matches the dependent NE or the dependent NS that is within the CR time window.

13. A system comprising:
a memory for storing instructions; and
a processor configured to execute the instructions to:
receive, from a user interface (UI), one or more network assurance policies configured to be used in a correlation and policy engine (CPE);
receive, periodically from a change request (CR) adaptor service, one or more active change requests (CRs) configured to be implemented;
store the one or more active CRs to an active scheduled CR table included in a network assurance policy database (DB);
filter, by an ingestion service of the CPE that screens incoming event streams based on the one or more network assurance policies, further the incoming event streams based on the active CRs within the active scheduled CR table; and
discard each incoming event from the incoming event streams that matches a dependent network element (NE) or a dependent network service (NS) that is within a CR time window where the CR time window is a period of time where a CR is being implemented.

14. The system of claim 13, wherein the filtering the incoming event streams based on the active CRs within the active scheduled CR table comprises:
screening the incoming event streams against the active scheduled CR table based on one or more of:
a network assurance policy identification (ID);
the dependent NE to be affected by an active CR;
the dependent NS to be affected by the active CR;
a CR start date; and
a CR end date.

15. The system of claim 13, further configured to:
request, from a CR system operably coupled to the CR adaptor service, one or more active CRs based on one or more NE identifications (IDs).

16. The system of claim 15, further configured to:
receive from the CR system a CR execution start time and CR duration for each active CR.

17. The system of claim 13, further configured to:
add a CR tag to each network assurance policy that matches the dependent NE or the dependent NS.

18. The system of claim 17, further configured to:
send a notification to the UI that includes information regarding each network assurance policy modification with the CR tag.

19. The system of claim 13, further configured to:
store the one or more network assurance policies in the network assurance policy DB.

20. The system of claim 13, further configured to:
initiate an action based on an active policy template for at least one of the incoming event streams for an NE or NS that is outside the CR window.

* * * * *